United States Patent [19]
Uchida

[11] Patent Number: 5,533,006
[45] Date of Patent: Jul. 2, 1996

[54] CONTROL SYSTEM FOR A RING TYPE NETWORK SYSTEM

[75] Inventor: Tetsuya Uchida, Kawasaki, Japan

[73] Assignee: Fujitsu Limited, Kanagawa, Japan

[21] Appl. No.: 196,057

[22] Filed: Feb. 14, 1994

[30] Foreign Application Priority Data

Sep. 13, 1993 [JP] Japan .................... 5-226780

[51] Int. Cl.⁶ ............................ H04L 11/22
[52] U.S. Cl. ........................ 370/16.1; 370/85.15
[58] Field of Search .................. 370/13, 15, 16, 370/16.1, 110.1, 85.12, 85.15; 340/825.05; 395/182.02, 182.01, 182.08

[56] References Cited

U.S. PATENT DOCUMENTS

| | | | |
|---|---|---|---|
| 4,506,357 | 3/1985 | Nakayashiki et al. | 370/16 |
| 4,593,154 | 6/1986 | Takeda et al. | 370/16 |
| 5,159,595 | 10/1992 | Flanagan et al. | 370/16 |
| 5,265,096 | 11/1993 | Parruck | 370/110.1 |
| 5,278,824 | 1/1994 | Kremer | 370/16.1 |
| 5,282,200 | 1/1994 | Dempsey et al. | 370/110.1 |
| 5,307,353 | 4/1994 | Yamashita et al. | 371/11.2 |

Primary Examiner—Wellington Chin
Assistant Examiner—Chau T. Nguyen

[57] ABSTRACT

A node for a ring type synchronous optical network can continue to communicate with another node, when a transmission path is interrupted, located on the opposite side of the interrupted transmission path. A cross connecting unit cross connects the ring type transmission path with an external transmission path. The cross connecting unit generates and sends to another node an alarm indication signal when the ring type optical path is interrupted. A path switching unit switches the connection of an external transmission path to either direction of the ring type transmission path. A controlling unit controls the path switching unit, when an alarm indication signal is received from another node, so that the path switching unit switches the connection to a side opposite to a side from which the alarm indication signal has been received.

11 Claims, 4 Drawing Sheets

FIG.I PRIOR ART

CONTROL SYSTEM FOR A RING TYPE NETWORK SYSTEM

BACKGROUND OF THE INVENTION

1. Field of the Invention

The present invention relates to a control system for a ring type network system, and more particularly to a control system for a ring type synchronous optical communication network system in which a plurality of nodes are connected via a ring type transmission path.

2. Description of the Prior Art

A synchronous optical network (SONET) in which a plurality of nodes are connected via a ring type transmission path is known to the art. Each of the nodes is provided with a cross connecting unit and a path switching unit. The cross connecting unit serves to make a cross connection between desired paths. The path switching unit serves to connect, for example, a low data transmission rate network to a desired path.

A description will be given, with reference to FIG. 1, of a conventional SONET. The SONET shown in FIG. 1 is a network in which a plurality of nodes A, B, C are connected via a ring type optical transmission line 34. The nodes A, B, C have cross connecting units 31a, 31b, 31c, path switching units 32a, 32b, 32c, and controlling units 33a, 33b, 33c, respectively. It should be noted that, although the SONET shown in FIG. 1 is described with only three nodes for convenience, a practical SONET generally comprises more than three nodes.

Each of the nodes A, B, C transmits multiple optical signals to the optical transmission line 34 comprising a plurality of optical paths in either direction. A cross connection between desired paths is made in the cross connecting units 31a, 31b, 31c. A connection of each reception path R is switched in the path switching units 32a, 32b, 32c. In the figure, the path switching units 32a and 32c are switched so that a signal from the node B is received by the node A, and a signal from the node A is received by the node C. Transmission paths S are connected to the corresponding path of the respective nodes A and C, and signals supplied via the paths S are added to signals transmitted via the optical transmission line 34 in either direction. Accordingly, the nodes A and C can mutually make a communication via the transmission paths S and the reception paths R.

On the assumption that a problem such as interruption of the optical fiber has occurred at a position marked by X on the optical transmission lines 34 between the nodes A and C, an optical signal transmitted by the node B cannot reach the node A. The node B detects the fact that the optical path to the node A is interrupted, and transmits, accordingly, to the node C an alarm indication signal (AI signal) via the transmission side of the cross connecting unit 31b. Additionally, after the node A detects the fact that the optical signal is interrupted, an AI signal is also sent from the reception side of the cross connecting unit 31a to the transmission side thereof. Formats for the AI signal have been already standardized in the SONET technology.

When the controlling unit 33a detects the AI signal, the controlling unit 33a switches the connection of the reception path R to the normally functioning side (node C side) opposite to the side (node B side) from which the AI signal is received. Additionally, the controlling unit 33c of the node C switches the path switching unit 32c when the AI signal is received from the node B. In the figure, since the reception path was initially switched to the node A side, the connection is not switched so as to maintain the connection in the same state. Accordingly, the communication between the nodes A and C can be continuously performed even though there is an interruption on the optical transmission line 34.

In the above-mentioned SONET, an unequipment code signal (UNEQ signal) is sent to a path which is not currently used. Formats for the unequipment code signal have been already standardized in the SONET technology. The controlling units 33a, 33b, 33c of the respective nodes A, B, C recognize that the path via which the UNEQ signal is received is a path which does not require a cross connection with other nodes, and accordingly the controlling units 33a, 33b, 33c do not control the path switching units 32a, 32b, 32c when the UNEQ signal is received.

In a case that the SONET comprises a number of nodes, alterations, cancellations and additions for the cross connection may be applied at various locations. If an erroneous setting of the cross connection is made, the corresponding path may be determined to be out of order. For example, when establishing a path between the nodes A and C, cross connection for the node B is set, as shown by a solid line in FIG. 1, in the cross connecting unit 31b. If the cross connection between the nodes A and C is not established, as shown by the cross connecting unit 31b in FIG. 2, due to an erroneous cancellation or an erroneous initial setting, an UNEQ signal is sent from the node B to the node A because a path between the nodes A and C is not established.

Since the controlling unit 33a does not perform switching on the path switching unit 32a when an UNEQ signal is received, the reception path R between the nodes A and C is determined to be interrupted at the node B. That is, there may be a problem in that communication between the nodes A and C is not established. In such a case, one solution to eliminate the problem is to search for the erroneously set node from among a number of nodes. That is, a seeking operation is performed for the particular node sending the UNEQ signal. However, finding the particular node is extremely difficult and not a practical solution because there are a number of cross connections in each of the nodes, which results in that a large number of cross connections must be checked.

SUMMARY OF THE INVENTION

It is a general object of the present invention to provide an improved and useful control system for a ring type synchronous optical network system in which the above-mentioned disadvantages are eliminated.

A more specific object of the present invention is to provide a node for a ring type synchronous optical network which node can continue to communicate, when a transmission path is interrupted, with another node located on the opposite side to the interrupted transmission path.

Another object of the present invention is to provide a node for a ring type synchronous optical network system which node can communicate, if there is an erroneous setting of a cross connection in one of the other nodes provided in the optical system, with another node located on the opposite side to that of the node having the erroneous setting of the cross connection.

In order to achieve the above-mentioned objects, there is provided, according to the present invention, a node in a ring type network in which a plurality of nodes are connected via a ring type transmission path, multiplexed signals being bidirectionally transmitted through the ring type transmission path, the node comprising:

a cross connecting unit for cross connecting the ring type transmission path, the cross connecting unit generating and sending to another node an alarm indication signal when the ring type transmission path is interrupted;

a path switching unit for switching the connection of an external transmission path to either direction of the ring type transmission path; and a controlling unit for controlling the path switching unit, when an alarm indication signal is received from another node, so that the path switching unit switches the connection of the external transmission path to a side opposite to a side from which the alarm indication signal has been received.

There is provided, according to the present invention, a node in a ring type network in which a plurality of nodes are connected via a ring type transmission path, multiplexed signals being bidirectionally transmitted through the ring type transmission path, the node comprising:

a cross connecting unit for cross connecting the ring type transmission path, the cross connecting unit generating and sending to another node an unequipment signal when a cross connection is not set in the cross connecting unit;

a path switching unit for switching the connection of an external transmission path to either direction of the ring type transmission path;

a controlling unit for controlling the path switching unit, when an unequipment signal is received from another node, so that the path switching unit switches the connection of the external transmission path to a side opposite to a side from which an unequipment signal has been received.

Other objects, features and advantages of the present invention will become more apparent from the following detailed description when read in conjunction with the accompanying drawings.

DETAILED DESCRIPTION OF THE PREFERRED EMBODIMENT

Figure 1:
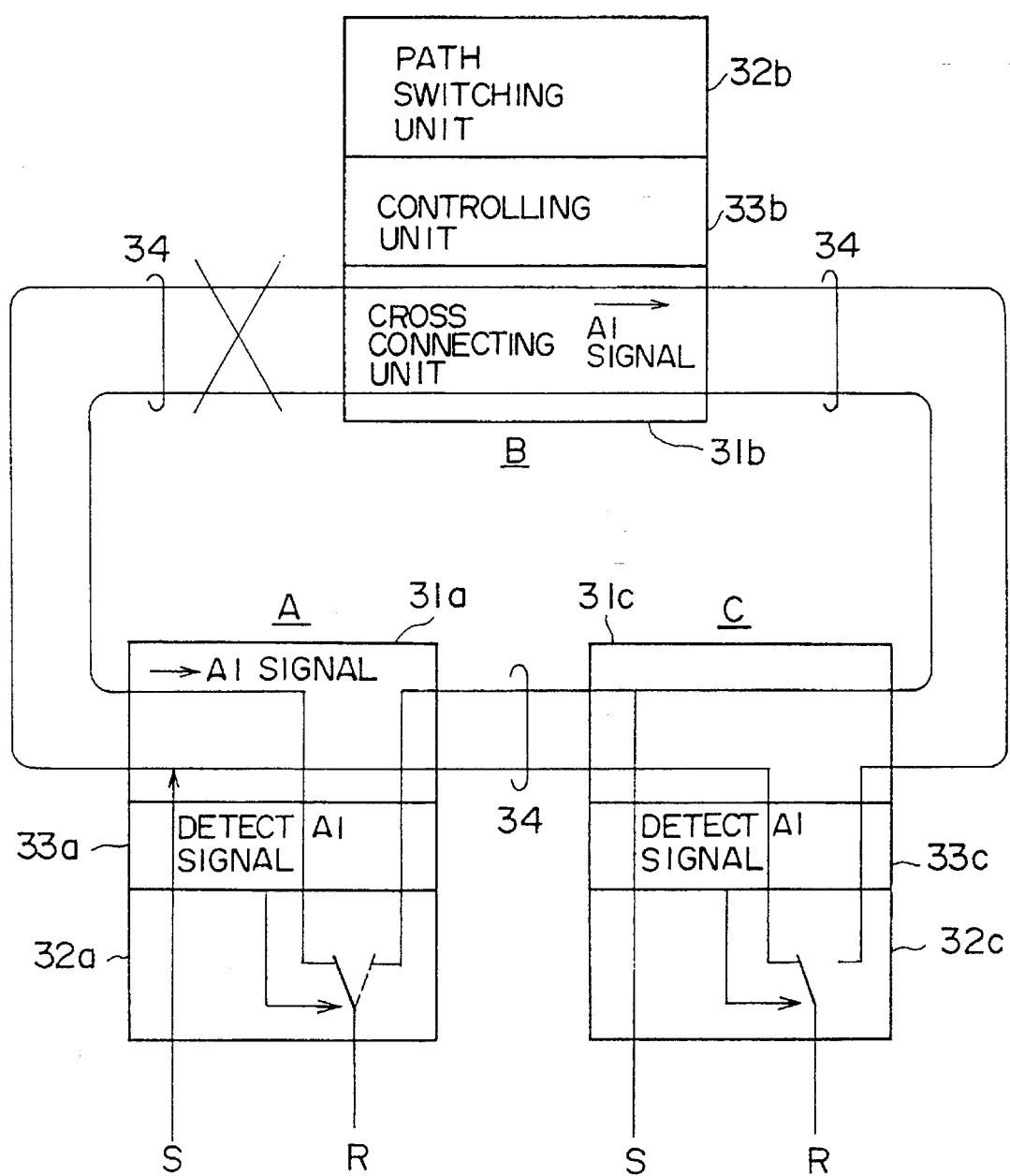
FIG. 1 is an illustration of an example of a conventional synchronous optical network.
Figure 2:
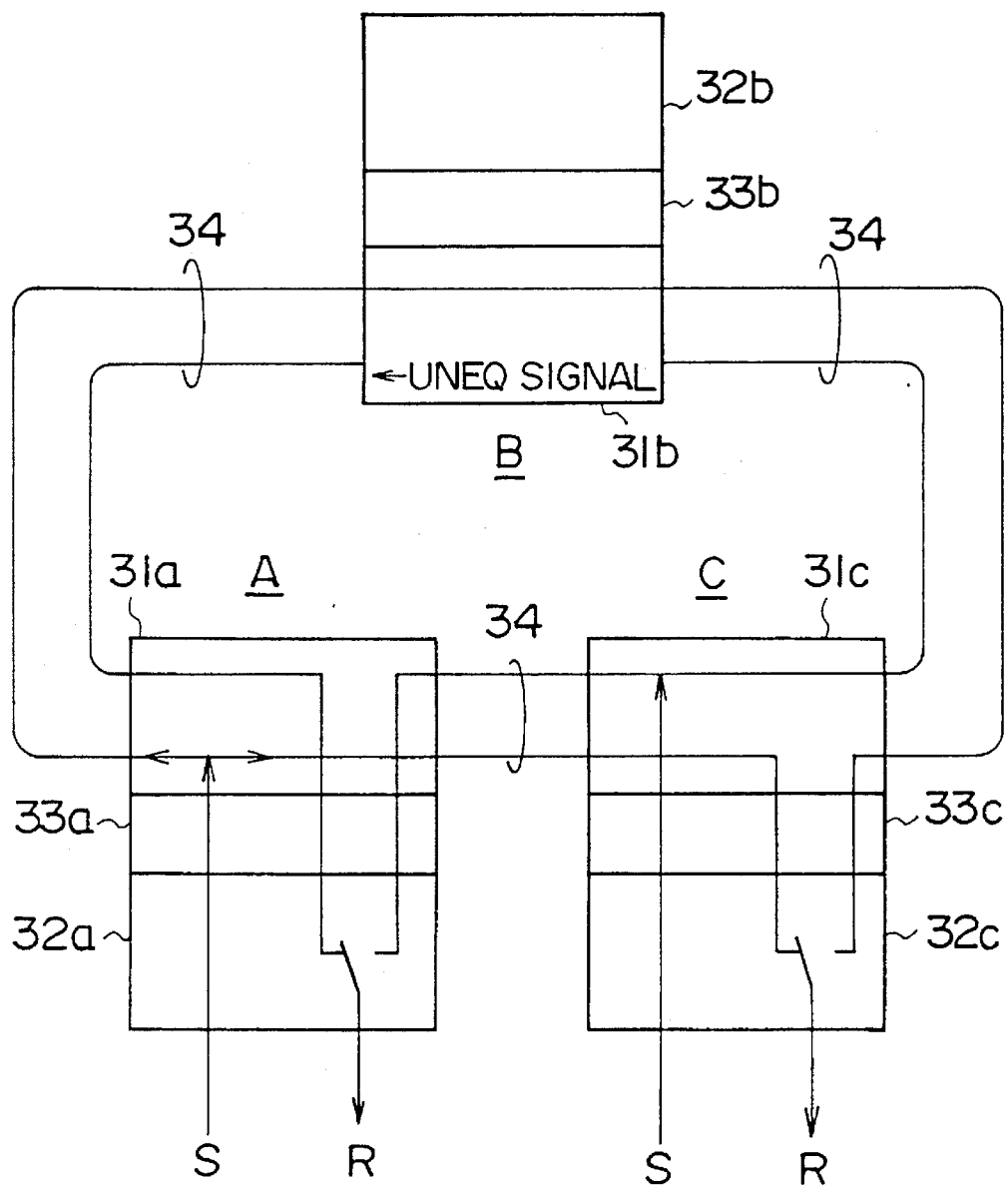
FIG. 2 is an illustration of the example of FIG. 1 for explaining a state where communication between two nodes is erroneously interrupted.
Figure 3:
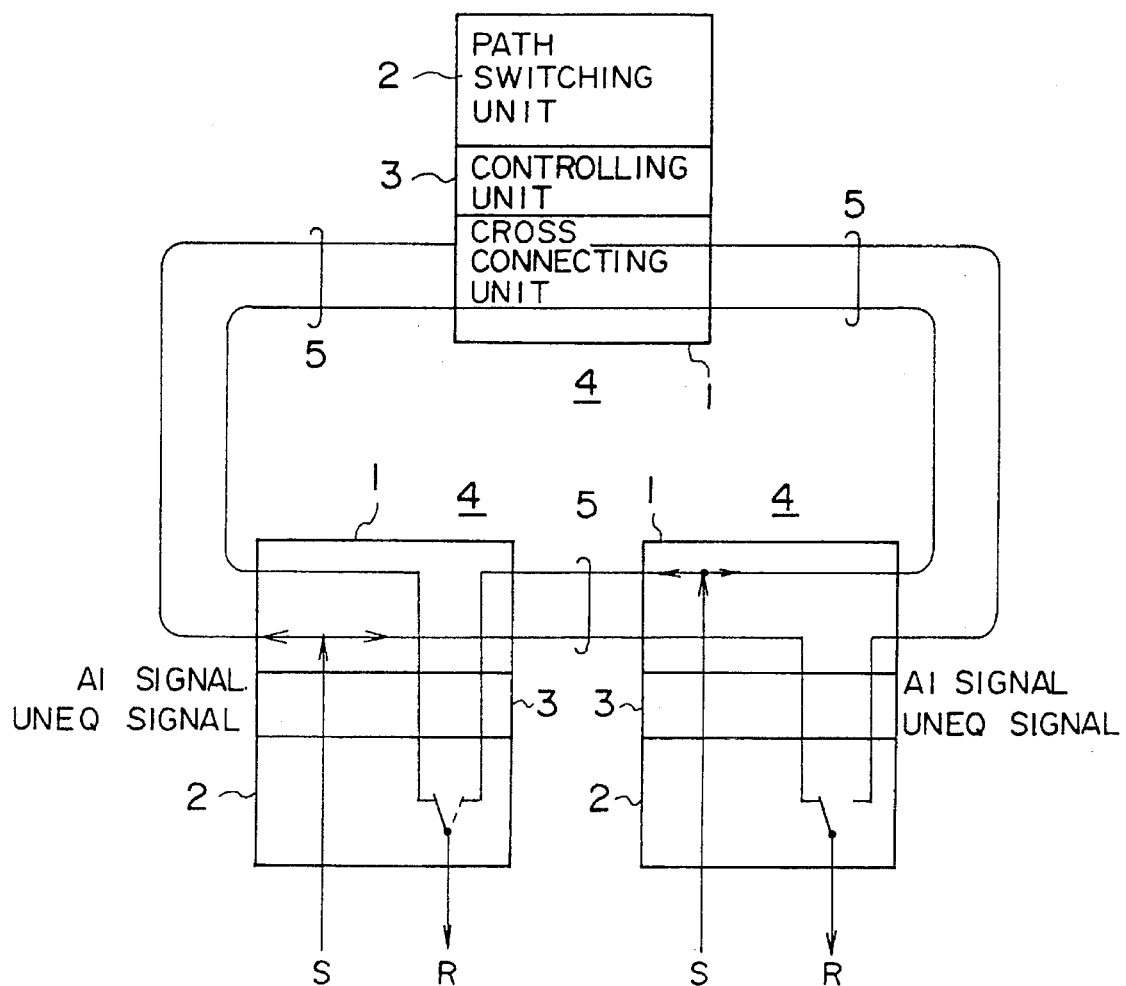
FIG. 3 is an illustration of an embodiment of a synchronous optical network according to the present invention.

A description will now be given, with reference to FIG. 3, of a synchronous optical network according to the present invention. FIG. 3 shows a structure of a synchronous optical network according to the present invention.

The network system according to the present invention comprises, similar to the conventional synchronous optical network, a plurality of nodes 4 connected via a ring type optical transmission line 5 comprising a plurality of optical paths. Multiplexed optical signals can be bidirectionally transmitted through the ring type optical transmission line 5. Each of the nodes 4 has a cross connecting unit 1, a path switching unit 2 and a controlling unit 3. The cross connecting unit 1 and the path switching unit 2 function similarly to that of the node provided in the conventional synchronous optical network described above.

The controlling unit 3 switches the path switching unit 2 so that a reception path R is switched to a side opposite to a side from which an alarm indication signal (AI signal) or an unequipment signal (UNEQ signal) is received.

Additionally, the controlling unit 3 can determine an optical path which is not in use. The controlling unit 3 inhibits switching of the path switching unit 2 when an UNEQ signal is received with respect to the optical path which is not in use.

Figure 4:
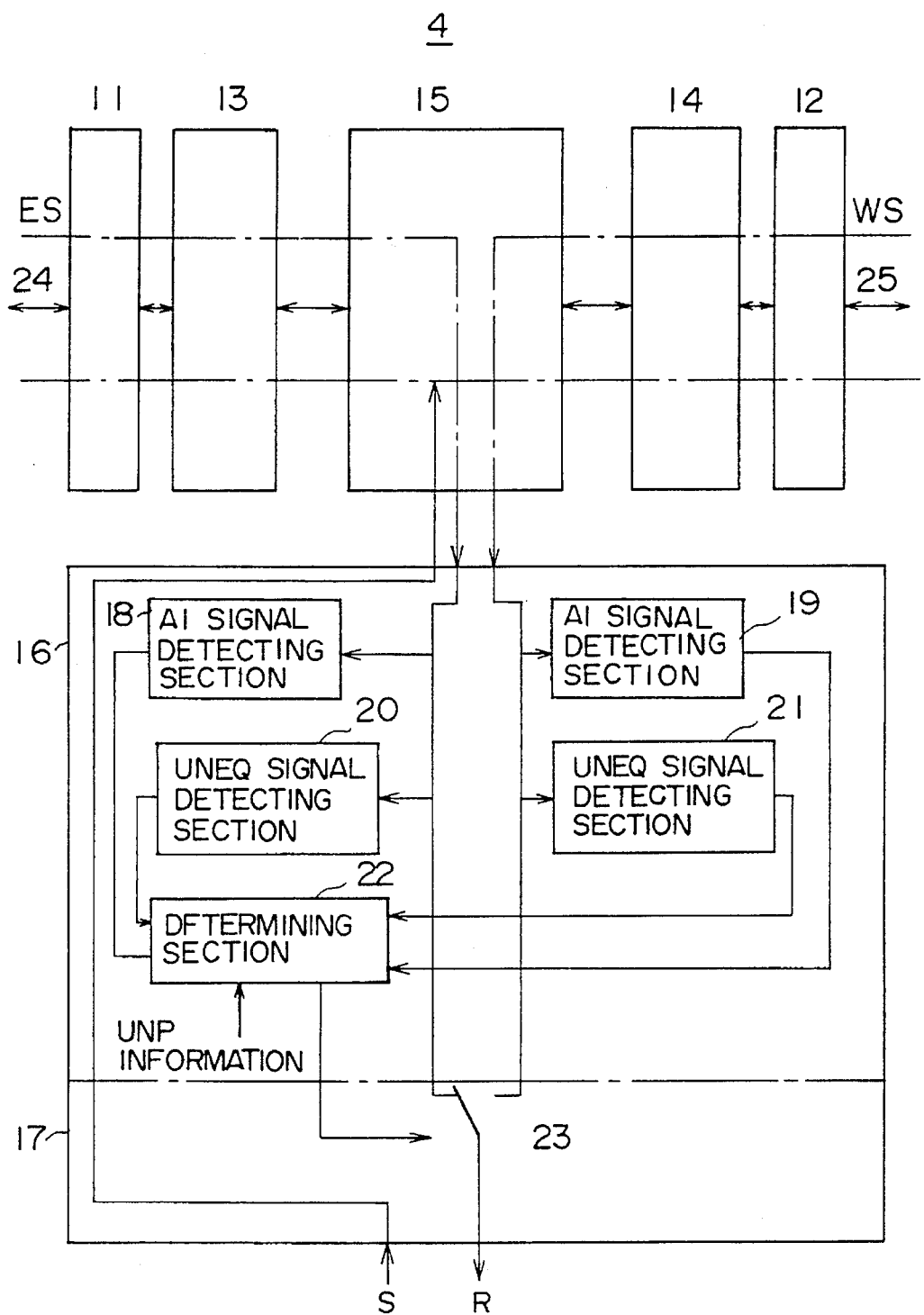
FIG. 4 is a block diagram of a node used in the network of FIG. 3.

A description will now be given, with reference to FIG. 4, of a structure of an embodiment of the node 4 shown in FIG. 3. FIG. 4 shows an essential part of the node according to the present invention.

The node 4 comprises converting units 11, 12, multiplexing/demultiplexing units 13, 14, a time slot interchanging unit 15, a controlling unit 16 and a path switching unit 17. The converting units 11, 12 convert optical signals into electric signals or convert electric signals into optical signals. The multiplexing/demultiplexing units 13, 14 perform a multiplexing operation and a demultiplexing operation on the signals. The time slot interchanging unit 15 performs a cross connection by interchanging signal time slots. The cross connecting unit of the node 4 comprises the converting units 11, 12, multiplexing/demultiplexing units 13, 14 and a time slot interchanging unit 15.

The controlling unit 16 comprises a first AI signal detecting section 18 and a second AI signal detecting section 19, a first UNEQ signal detecting section 20 and a second UNEQ signal detecting section 21, and a determining section 22. A variety of known structures may be adopted for the first AI signal detecting section 18 and the second AI signal detecting section 19 since the format for AI signals has already been standardized. Additionally, structures of the first UNEQ signal detecting section 20 and the second UNEQ signal detecting section 21 can be easily realized since the format for UNEQ signals has already been standardized.

The determining section 22 determines whether or not only one AI signal is input from another node to the node 4 in accordance with a first detection signal input from the AI signal detecting section 18 and a second detection signal input from the AI signal detecting section 19. The determining section 22 also determines whether or not only one UNEQ signal is input from another node to the node 4 in accordance with a third detection signal input from the UNEQ signal detecting section 20 and a fourth detection signal input from the UNEQ signal detecting section 21. The determining section 22 switches the path switch 23 in accordance with the result of the determination. Additionally, an unused path switch information (UNP) information is supplied for the path which will not be in use. The UNP information is input by the operator via an operational input terminal (not shown in the figure) to the node 4. If a UNEQ signal is detected, by the UNEQ signal detecting sections 20 and 21, for the path indicated by the UNP information, the controlling unit 16 prevents the switching operation for the path switch 23 from being performed.

The path switching unit 17 comprises at least one path switch 23. The node 4 having the above-mentioned structure is connected with optical transmission paths 24 and 25 at the converting units 11 and 12, respectively.

A description will now be given of an operation of the above-mentioned node 4.

An optical signal received by the converting unit 11 via the east side (ES) optical transmission path 24 is converted into an electric signal in the converting unit 11, and then the electric signal is demultiplexed by the multiplexing/demultiplexing unit 13. The electric signal is then subject to a time slot interchanging process by the time slot interchanging unit 15 in accordance with a given cross connection setting condition. After the time slot interchanging operation is performed, a signal to be added to the path is multiplexed by the multiplexing/demultiplexing unit 14. The multiplexed electric signal is then converted into an optical signal by the converting unit 12, and is sent to other nodes via the west side (WS) optical transmission path 25.

On the other hand, an optical signal received by the converting unit 12 via the west side optical transmission path 25 is converted into an electric signal in the converting unit 14, and then the electric signal is demultiplexed by the multiplexing/demultiplexing unit 14. The electric signal is then subject to a time slot interchanging process by the time slot interchanging unit 15 in accordance with a given cross connection setting condition. After the time slot interchanging operation is performed, a signal added to the path is multiplexed by the multiplexing/demultiplexing unit 13. The multiplexed electric signal is then converted into an optical signal by the converting unit 11, and is sent to other nodes via the ES optical transmission path 24.

A signal supplied via the transmission path S to the path switching unit 17 is inserted into the time slot of a given path, and the inserted signal is sent towards both directions ES and WS. A signal received via the optical transmission path 24 or 25 is separated from the time slot of the given path by the time slot interchanging unit 15, and supplied to the path switch 23. The separated signal is then sent via a reception path R. The selection of the signal, from ES or WS, to be sent via the reception path R is made by switching the path switch 23.

The AI signal detecting section 18 detects an AI signal from the east side, and sends a first detection signal to the determining section 22. The AI signal detecting section 19 detects an AI signal from the west side, and sends a second detection signal to the determining section 22. If the determining section 22 receives the first detection signal from the AI signal detecting unit 18 corresponding to the east side, and does not receive the second detection signal from the AI signal detecting unit 19 corresponding to the west side, the determining section switches the path switch R so that the reception path R is connected to the west side. That is, if it is determined by the determining section 22 that an AI signal is received only from either the west side or the east side, it is indicated that there is an interruption in the optical transmission path at a position on the side from which the AI signal is received. By the above switching operation of the path switch 23, the reception path R is switched from the abnormal east side to the normal west side.

The UNEQ signal detecting section 20 detects an UNEQ signal from the east side, and sends a third detection signal to the determining section 22. The UNEQ signal detecting section 21 detects an UNEQ signal from the west side, and sends a fourth detection signal to the determining section 22. If the determining section 22 receives the third detection signal from the UNEQ signal detecting section 20 corresponding to the east side, and does not receive the fourth detection signal from the UNEQ signal detecting unit 21 corresponding to the west side, the determining section 22 switches the path switch so that the reception path is connected to the west side. That is, if it is determined by the determining section that an UNEQ signal is received from the east side due to an erroneous setting of the cross connection in a node located on the east side, the connection of the reception path R is switched to the west side so that a transmission path can be established with the node located on the west side. Therefore, the node having an erroneous setting or an erroneous cancellation of the cross connection can be found by following the nodes through the transmission path, and thus the erroneous setting or the erroneous cancellation of the cross connection can be recovered by applying an appropriate treatment.

In the above-mentioned case, since an UNEQ signal is sent for all paths which are not in use, the determining section 22 must switch the path switches corresponding to all UNEQ signals, resulting in an increase of the processing load on the determining section 22. In order to reduce the processing load of the determining section 22, the third or fourth detection signal corresponding to the path indicated by the UNP signal is ignored. That is, a UNP signal is supplied to the determining section 22, and thereby the control for the switching of the path switch 23 with respect to the path indicated by the UNP signal is not performed. Therefore, an unnecessary controlling operation is eliminated, and thus the processing load of the determining section 22 can be reduced.

Additionally, if UNEQ signals are received from both the east side and the west side, the third and the fourth detection signals are supplied to the determining section 22 from the UNEQ signal detecting section 20 and the UNEQ signal detecting section 21 at the same time. In such a case, the determining section 22 may be set to maintain the initial state of the path switching unit 17, or may be set to control to switch the path switch 23 to a predetermined side.

Although the above-mentioned embodiment is directed to a ring type synchronous optical network, the present invention may be applied to a ring type network using an electric signal transmission path. Additionally, although the cross connecting unit in the above embodiment is described as performing a cross connection on electric signals, an cross connection may be performed directly on optical signals.

The present invention is not limited to the specifically described embodiment, and variations and modifications may be made without departing from the scope of the present invention.

What is claimed is:

1. A node provided in a ring type network having a plurality of nodes coupled to each other via ring type transmission path means having signal receiving paths and signal transmitting paths for respectively receiving and transmitting multiplexed signals in mutually opposite directions between said nodes, the node comprising:

cross connecting means, coupled to said ring type transmission path means, for cross connecting the paths of the ring type transmission path means by dropping signals in time slots of the node and passing through signals in time slots of other nodes of the network;

path switching means, coupled to said cross connecting means, for switching only signal receiving paths of said ring type transmission path means to connect the node to one of two signal receiving paths from which said node is to receive a signal; said two signal receiving paths transmitting signals in two mutually opposite directions; and controlling means, coupled to said path switching means, for controlling a switching operation of said path switching means to connect the node to one of the two signal receiving paths in response to at least one unequipment code signal received via another of said two signal receiving paths from an arbitrary node coupled to said node and indicating an unused path which is not cross-connected in said arbitrary node.

2. The node as claimed in claim 1, wherein said controlling means also controls switching of said path switching means to connect the node to one of the two signal receiving paths in response to an alarm indication signal received via said another of said two signal receiving paths from another arbitrary node coupled to said node and indicating a connection failure between said node and said arbitrary node coupled to said node.

3. The node as claimed in claim 1, wherein said controlling means determines an unused path of said node and inhibits switching of said path switching means when an unequipment code signal is received with respect to said unused path of said node.

4. The node as claimed in claim 1, wherein said cross-connecting means is coupled to optical paths forming said ring type transmission path means.

5. A node provided in a ring type network having a plurality of nodes coupled to each other via ring type transmission path means having signal receiving paths and signal transmitting paths for respectively receiving and transmitting multiplexed signals in mutually opposite directions between said nodes, the node comprising:

cross connecting means, coupled to said ring type transmission path means, for cross connecting the paths of the ring type transmission path means by dropping signals in time slots of the node and passing through signals in time slots of other nodes of the network;

path switching means, coupled to said cross connecting means, for switching only signal receiving paths of said ring type transmission path means to connect the node to one of two signal receiving paths from which said node is to receive a signal; said two signal receiving paths transmitting signals in two mutually opposite directions; and controlling means, coupled to said path switching means, for controlling a switching operation of said path switching means to connect the node to one of the two signal receiving paths in response to at least one unequipment code signal received via another of said two signal receiving paths from one arbitrary node coupled to said node and indicating an unused path which is not cross-connected in said one arbitrary node, said controlling means also controlling switching of said path switching means to connect the node to one of the two signal receiving paths in response to an alarm indication signal received via said another of said two signal receiving paths from another arbitrary node coupled to said node and indicating a connection failure between said node and said one arbitrary node coupled to said node, wherein said controlling means comprises:

a first alarm indication signal detecting means, coupled to said cross connecting means, for detecting a first alarm indication signal received from a first signal receiving path of said two signal receiving paths and outputting a first detection result signal;

a first unequipment code signal detecting means, coupled to said cross connecting means, for detecting a first unequipment code signal received from said first signal receiving path and outputting a second detection result signal;

a second alarm indication signal detecting means, coupled to said cross-connecting means, for detecting a second alarm indication signal received from a second signal receiving path of said two signal receiving paths and outputting a third detection result signal;

a second unequipment code signal detecting means, coupled to said cross-connecting means, for detecting a second unequipment code signal received from said second signal receiving path and outputting a fourth detection result signal; and a determining means, coupled to said first and second alarm indication signal detecting means and to said first and second unequipment signal detecting means, for comparing the first and third detection result signals received from said first and second alarm indication signal detecting means and the second and fourth detection result signals received from said first and second unequipment code signal detecting means, respectively, and for controlling the switching of said path switching means based on the comparison.

6. A control system for a ring type network comprising:

a plurality of nodes; and ring type transmission path means having signal receiving paths and signal transmitting paths for respectively receiving and transmitting multiplexed signals in mutually opposite directions between said nodes;

said plurality of nodes being coupled to each other via said ring type transmission path means to form the ring type network, at least one of said nodes comprising:

cross-connecting means, coupled to said ring type transmission path means, for cross-connecting the paths of the ring type transmission path means by dropping signals in time slots of said one node and passing through signals in time slots of other nodes of the network;

path switching means, coupled to said cross-connecting means, for switching only signal receiving paths of said ring type transmission path means to connect said at least one node to one of two signal receiving paths from which said at least one node is to receive a signal, said two signal receiving paths transmitting signals in two mutually opposite directions; and controlling means, coupled to said path switching means, for controlling a switching operation of said path switching means to connect said at least one node to one of the two receiving paths in response to at least one unequipment code signal received via another of said two signal receiving paths from an arbitrary node coupled to said at least one node and indicating an unused path which is not cross-connected in said arbitrary node.

7. The control system as claimed in claim 6, wherein said controlling means of said at least one node also controls switching of said path switching means to connect said at least one node to one of the two signal receiving paths in response to an alarm indication signal received via another of said two received paths for another arbitrary node coupled to said at least one node and indicating a connection failure between said at least one node and said arbitrary node coupled to said at least one node.

8. The control system as claimed in claim 6, wherein said controlling means of said at least one node determines an unused path of said at least one node and inhibits switching of said path switching means when an unequipment code signal is received with respect to said unused path of said at least one node.

9. The control system as claimed in claim 6, wherein said ring type transmission path means comprise optical paths.

10. The control system as claimed in claim 9, wherein said optical paths of said ring type transmission path means couple said nodes to form a synchronous optical communication network.

11. A control system for a ring type network comprising:

a plurality of nodes; and ring type transmission path means having signal receiving paths and signal transmitting paths for respectively receiving and transmitting multiplexed signals in mutually opposite directions between said nodes;

said plurality of nodes being coupled to each other via said ring type transmission path means to form the ring type network, at least one of said nodes comprising:

cross-connecting means, coupled to said ring type transmission path means, for cross-connecting the paths of the ring type transmission path means by dropping signals in time slots of said at least one node and passing through signals in time slots of other nodes of the network;

path switching means, coupled to said cross-connecting means, for switching only signal receiving paths of said ring type transmission path means to connect said at least one node to one of two signal receiving paths from which said at least one node is to receive a signal, said two signal receiving paths transmitting signals in two mutually opposite directions; and controlling means, coupled to said path switching means, for controlling a switching operation of said path switching means to connect said at least one node to one of the two receiving paths in response to at least one unequipment code signal received via another of said two signal receiving paths from one arbitrary node coupled to said at least one node and indicating an unused path which is not cross-connected in said one arbitrary node, said controlling means of said at least one node also controlling switching of said path switching means to connect said at least one node to one of the two signal receiving paths in response to an alarm indication signal received via another of said two received paths from another arbitrary node coupled to said at least one node and indicating a connection failure between said at least one node and said one arbitrary node, coupled to said at least one node, wherein said controlling means of said at least one node comprises:

a first alarm indicating signal detecting means, coupled to said cross-connecting means, for detecting a first alarm indication signal received from a first signal receiving path of said two signal receiving paths and outputting a first detection result;

a first unequipment code signal detecting means, coupled to said cross-connecting means, for detecting a first unequipment code signal received from said first signal receiving path and outputting a second detection result;

a second alarm indication signal detecting means, coupled to said cross-connecting means, for detecting a second alarm indication signal received from a second signal receiving path of said two signal receiving paths and outputting a third detection result;

a second unequipment code signal detecting means, coupled to said cross-connecting means, for detecting a second unequipment code signal received from said second signal receiving path and outputting a fourth detection result; and a determining means, coupled to said first and second alarm indication signal detecting means and to said first and second unequipment code signal detecting means, for comparing the first and third detection results received from said first and second alarm indication signal detecting means and the second and fourth detection results received from said first and second unequipment code signal detecting means, respectively, and for controlling the switching of said path switching means based on the comparison.

* * * * *